United States Patent
Francalanci et al.

(10) Patent No.: US 9,296,889 B2
(45) Date of Patent: Mar. 29, 2016

(54) PROCESS FOR THE PRODUCTION OF ACRYLIC FIBERS

(71) Applicant: MONTEFIBRE MAE TECHNOLOGIES S.r.l., Milan (IT)

(72) Inventors: Franco Francalanci, Novara (IT); Pierluigi Gozzo, Noale (IT); Massimo Marinetti, Mestre (IT); Roberto Proserpio, Mariano Comense (IT)

(73) Assignee: Montefibre Mae Technoogies S.r.l., Milan (IT)

( * ) Notice: Subject to any disclaimer, the term of this patent is extended or adjusted under 35 U.S.C. 154(b) by 0 days.

(21) Appl. No.: 14/591,330

(22) Filed: Jan. 7, 2015

(65) Prior Publication Data

US 2015/0376391 A1 Dec. 31, 2015

(30) Foreign Application Priority Data

Jan. 10, 2014 (IT) .............................. MI2014A0027

(51) Int. Cl.
*C08K 5/41* (2006.01)
*C08L 33/20* (2006.01)
*D01D 1/02* (2006.01)
*D01D 4/06* (2006.01)
*D01D 5/06* (2006.01)
*D01F 6/18* (2006.01)
*D01F 6/38* (2006.01)
*B01F 1/00* (2006.01)
*B01F 5/06* (2006.01)

(52) U.S. Cl.
CPC .............. *C08L 33/20* (2013.01); *B01F 1/0022* (2013.01); *B01F 5/0602* (2013.01); *D01D 1/02* (2013.01); *D01D 4/06* (2013.01); *D01D 5/06* (2013.01); *D01F 6/18* (2013.01); *D01F 6/38* (2013.01); *C08L 2201/54* (2013.01); *C08L 2203/12* (2013.01); *D10B 2321/10* (2013.01)

(58) Field of Classification Search
CPC . C08L 33/20; C08L 2201/54; C08L 2203/12; D01F 6/38; D01F 6/18; B01F 1/0022; B01F 5/0602; D10B 2321/10
USPC ......................................................... 524/173
See application file for complete search history.

(56) References Cited

U.S. PATENT DOCUMENTS

| | | |
|---|---|---|
| 4,403,055 A | 9/1983 | Hungerford |
| 2012/0027944 A1* | 2/2012 | Yu .......................... B82Y 30/00 427/462 |

OTHER PUBLICATIONS

Lux, Rudolf, "Italian Search Report and Written Opinion for ITMI20131972," Italian Patent and Trademark Office (UIBM), Sep. 5, 2014.

* cited by examiner

*Primary Examiner* — Hui Chin
(74) *Attorney, Agent, or Firm* — Florek & Endres PLLC

(57) ABSTRACT

A process for the preparation of a homogeneous spinning solution for the production of acrylic fibers comprising:
i) preparation of a homogeneous suspension by mixing a powder homopolymer or copolymer of acrylonitrile with a mixture of DMSO/water ranging from 94.5/5.5 to 97/3% w/w at a temperature ranging from 5° C. to 10° C., said mixing being carried out in a time from 5 to 30 minutes, by spraying a stream of the DMSO/water solvent onto a stream of powder homopolymer or copolymer of acrylonitrile, disgregated and premixed;
ii) heating the homogeneous suspension from step i) to a temperature from 70° C. to 150° C. in a time from 0.5 to 30 minutes, until the complete dissolution of the homopolymer or copolymer and the formation of a homogeneous solution. This spinning solution is then fed to a storage tank or to the spinning line.

14 Claims, 1 Drawing Sheet

PROCESS FOR THE PRODUCTION OF ACRYLIC FIBERS

The present invention relates to a process for the production of acrylic fibers, in particular to a process for the preparation of a spinning solution for the production of acrylic fibers.

More specifically, the present invention falls within the field relating to the production of acrylic fibers, which envisages the preparation of polymers starting from acrylonitrile or copolymers mainly composed of acrylonitrile (90-99% by weight with respect to the overall weight of the polymer) and one or more comonomers in a quantity generally ranging from 1 to 10% by weight with respect to the overall weight of the polymer.

Preferred comonomers are either neutral vinyl molecules such as methyl acrylate, methyl methacrylate, vinyl acetate, acrylamide and analogous compounds, or molecules carrying one or more acid groups such as acrylic acid, itaconic acid sulfonated styrene groups and analogous compounds, or other comonomers capable of imparting different physico-chemical characteristics to the material.

The polymers and copolymers thus prepared are then subjected to spinning to produce fibers which are collected in tows, suitable for being subsequently transformed into manufactured products through various processing techniques, for both textile and technical uses.

Particular types of acrylic fibers are fibers used as "precursors" for carbon fibers: these are high-molecular-weight copolymers of acrylonitrile and one or more comonomers selected from those described above, in a quantity generally ranging from 1 to 5% by weight with respect to the overall weight of the polymer.

Carbon fibers are then obtained by suitable thermal treatment of these "precursor" fibers based on polyacrylonitrile.

Various industrial processes are available for the preparation of acrylic fibers, using different polymerization and spinning methods.

The state of the art can be subdivided and schematized as follows:

A. Discontinuous Processes (Two-Step).

In two-step discontinuous processes, the polymer is generally produced in aqueous suspension, isolated and subsequently dissolved in a suitable solvent for being spun and transformed into fiber or precursor fiber in the case of carbon fibers. The solvents most commonly used for the preparation of the spinning solution are: dimethylacetamide (DMAC), dimethylformamide (DMF) and an aqueous solution of sodium thiocyanate (NaSCN).

B. Continuous Processes (One-Step)

In continuous processes, on the other hand, the polymerization takes place in a solvent and the solution thus obtained is used directly in the spinning process without the intermediate isolation of the polymer. The most widely-used solvents in these processes are: dimethylformamide (DMF), dimethylsulfoxide (DMSO), aqueous solution of zinc chloride ($ZnCl_2$) and aqueous solution of sodium thiocyanate (NaSCN).

Discontinuous processes have considerable advantages from an operational point of view: the two polymerization and spinning steps are in fact independent, the starting monomers do not have to be purified and the traces of impurities and non-reacted monomers can be easily separated from the polymer in powder form. DMSO is a particularly interesting solvent, thanks to its capacity of forming solutions with a high polymer concentration, its low toxicity and easy recovery and recycling, in addition to the absence of corrosion phenomena associated with its use.

Various examples are provided in literature in which discontinuous processes have been carried out, on a laboratory scale, preparing spinning solutions by dissolving polymers and copolymers of acrylonitrile in DMSO: no industrial processes are known, however, for the production of fibres in two steps, i.e. discontinuously, which exploit both the advantages of aqueous suspension polymerization, and also the advantages of spinning a polymer solution in DMSO. This kind of process would be extremely useful, as it would be characterized by a high efficiency and a low environmental impact.

This is not an easy process to implement, however; the optimum solvent capacity of DMSO, in fact, already at room temperature, causes the partial dissolution of the surface of the polymer particles in powder form, with the consequent tendency of the same to adhere to each other forming insoluble agglomerates and gels which are difficult to dissolve (as described in U.S. Pat. No. 4,403,055), which make a correct and economic running of an industrial process of this kind, impossible.

The use of DMSO as solvent of polyacrylonitrile-based polymers for spinning solutions in discontinuous processes, in fact, has the considerable drawback of leading to the formation of gels and insoluble agglomerates and consequently to the clogging of the plant filters in very rapid times, which is not compatible with the correct functioning of an industrial production line.

It is known to persons skilled in the field that an efficient way of limiting the dissolution of a polymer in a solvent is to operate at low temperatures (for example, temperatures ranging from −5° C. to 10° C.) in the mixing phase of the powder polymer with the liquid solvent. In the case of DMSO, this expedient cannot be used due to the high melting point of DMSO (18.5° C.) which is consequently solid at around room temperature.

Another way of reducing the entity of the initial dissolution of the polymer, described in U.S. Pat. No. 4,403,055, consists in adding water to DMSO to reduce its solubilizing capacity with respect to the polymer. US'055, in fact, describes the formation of a polymer suspension at room temperature in a mixture of DMSO and water, containing at least 6% by weight of water. This suspension is subsequently heated to 88° C., the water added is removed by evaporation under vacuum and the solution is concentrated to the desired value by evaporating the DMSO. This process however has various drawbacks and contraindications which mainly consist in the very lengthy times necessary for effecting the slow addition of the powder polymer to the solvent under stirring: US'055 indicates a time of about 90 minutes in example 1, which is incompatible with an industrial application, and also in the necessity of removing a relevant quantity of water by heating under vacuum, again requiring long periods of time. In addition to being extremely time-consuming, these passages evidently also imply high energy costs.

The objective of the present invention is therefore to find a process for the production of acrylic fibers which overcomes the drawbacks of the processes of the state of the art.

DETAILED DESCRIPTION OF THE INVENTION

Figure 1:
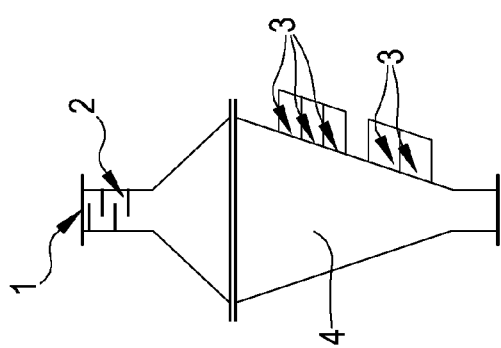
FIG. 1 is a schematic elevation of a mixing apparatus used to mix the polymer with the solvent of the present invention.

The object of the present invention therefore relates to a process for the preparation of a homogeneous spinning solution for the production of acrylic fibers which comprises the following steps:

i) preparation of a homogeneous suspension by mixing a powder homopolymer or copolymer of acrylonitrile with a mixture of DMSO/water in an amount ranging from 94.5/5.5 to 97/3% w/w at a temperature ranging from 5° C. to 10° C., preferably a mixture of DMSO/water 95/5 at a temperature of 5° C., said mixing being carried out in a time ranging from 5 to 30 minutes, by spraying a stream of the DMSO/water solvent on a stream of powder homopolymer or copolymer of acrylonitrile, disgregated and premixed;

ii) heating the homogeneous suspension coming from step i) to a temperature ranging from 70° C. to 150° C. in a time ranging from 0.5 to 30 minutes, until the complete dissolution of the homopolymer or copolymer and the formation of a homogeneous solution.

The homogeneous spinning solution obtained at the end of the process according to the present invention is free of gels and undissolved residues and can be fed directly to the spinning line (apparatus) or to a storage tank.

The present invention therefore allows a solution of homopolymers or copolymers of acrylonitrile to be obtained, free of gels and without the formation of insoluble agglomerates, reducing the solvent capacity of DMSO in the first contact phase between the powder polymer and the solvent. The formation of a homogeneous suspension (slurry) is thus obtained, which is then transformed into a homogeneous solution, free of gels and undissolved material, by heating the suspension itself. The process according to the present invention therefore allows the two polymerization and spinning steps to be easily integrated.

Furthermore, phase i), carried out by spraying a stream of DMSO/water solvent on a stream of powder homopolymer or copolymer of acrylonitrile, disgregated and premixed, allows a particular distribution of the solvent on the polymer to be obtained, which facilitates the intense imbibition of the powder with the solvent, preventing the formation of conglomerations which are difficult to disperse and dissolve and at the same time, optimizing the formation of a fine and homogeneous suspension.

In the present description, the term polymer generally refers to both homopolymers obtained starting from acrylonitrile and copolymers obtained starting from acrylonitrile and one or more other comonomers.

In particular, the polymers are high-molecular-weight polymers, having MWn ranging from 80,000 to 200,000 or they are medium-molecular-weight polymers, having a MWn ranging from 40,000 to 55,000.

In the process according to the present invention, the preferred mixture in step i) is a mixture of DMSO/water 95/5% w/w having a freezing point close to 5° C., this temperature having proved to be also optimal for obtaining polymeric suspensions capable of supplying good spinning solutions.

The mixture of DMSO/water in the ratio, according to the present invention, of 97/3 to 94.5/5.5, is also a good solvent for homopolymers and copolymers of acrylonitrile, and is consequently capable of providing spinning solutions having rheological characteristics analogous to the polymeric solutions obtained with solvents known in spinning technologies of acrylic fibers and acrylic precursors for carbon fibers.

A further advantage of the process according to the present invention lies in the specific quantity of water introduced into the solution then fed to the spinning process: the percentage of water present in the process for the preparation of the homogeneous solution for the production of acrylic fibers according to the present invention is, in fact, absolutely compatible with the spinning technologies of acrylic fibers, according to both the dry and wet spinning technology or with the DJWS (dry jet wet spinning or air gap) technology, and it is consequently not necessary to remove the water from the solution destined for spinning.

This operation, i.e. the removal of water, can in any case be effected if a homogeneous solution, free of water or with a reduced content of humidity, is to be obtained.

Furthermore, the presence of small percentages of water in the spinning solutions for acrylic fibers, facilitates the compatibilization of the same solution with the coagulation bath, i.e. making it more akin to the solution of this bath when the fiber is formed. In the case of wet spinning, it is believed that this compatibilization phenomenon of the solution with the coagulation bath improves the characteristics of the coagulation conditions, leading to a fiber free of vacuoles and voids; these characteristics are particularly advantageous in the production of precursors for carbon fibers or textile fibers having a good gloss and compact structure.

The process for the preparation of the homogeneous spinning solution for the production of acrylic fibers according to the present invention, preferably envisages the preparation of polymers, such as homopolymers starting from acrylonitrile or copolymers mainly composed of acrylonitrile (90-99% by weight with respect to the total weight of the polymer) or one or more other comonomers in an amount generally ranging from 1 to 10% by weight with respect to the total weight of the polymer.

Preferred comonomers are both neutral vinyl compounds, such as methyl acrylate, methyl methacrylate, vinyl acetate, acrylamide and similar products, and also compounds bearing one or more acid groups such as acrylic acid, itaconic acid, sulfonated styrenes and similar products, or other comonomers capable of imparting different physico-chemical characteristics to the material.

Particular types of acrylic fiber are "precursor" fibers for carbon fibers: these are high-molecular-weight copolymers (MWn 80,000-200,000) of acrylonitrile (90-99% by weight with respect to the total weight of the copolymer) and one or more comonomers, selected from those described above, in an amount generally ranging from 1 to 5% by weight with respect to the total weight of the copolymer.

A further object of the present invention also relates to an apparatus for the preparation of a homogeneous spinning solution for the production of acrylic fibers according to the present invention. Said apparatus comprises an inlet area for feeding the polymer or copolymer powder, provided with baffles and downstream of which there is a chamber or static mixer, equipped with spray nozzles for feeding the solvent, distributed on a circumference at 120° from each other and positioned on four different levels inside said chamber or mixer.

In an embodiment of the present invention, in fact, step i) for mixing the polymer in powder form with the cold solvent can be conveniently effected with the use of the equipment described in FIG. 1.

The matrix of aggregated polymer, coming from 1, is initially disgregated and premixed by an internal baffles system 2, before being subjected to spraying with the stream of solvent. The solvent is sprayed against the polymer stream by means of twelve spray nozzles 3, distributed on a circumference at 120° from each other and positioned on four different levels inside a chamber or static mixer 4 (three sprayers for each level).

The pressure of the solvent in the supply manifold of the sprayers is maintained at 2.5 to 3.5 $bar_{abs}$ in order to obtain a homogeneous mixing of the polymer stream with the stream of solvent.

The apparatus described herein is particularly advantageous for the preparation of the polymeric suspension of step i) of the process according to the present invention: the particular distribution of the solvent on the polymer, in fact, facilitates the intense imbibition of the powder with the solvent, thus preventing the formation of agglomerates which are difficult to disperse and dissolve and, at the same time, optimizing the formation of a fine and homogeneous suspension.

The suspension maintained at a low temperature (for example at 5° C.) enables a complete imbibition of the polymeric particles in the solvent, also allowing the penetration of the solvent inside the polymer granules, thus uniformly dissolving the polymer and preventing the formation of gels which are difficult to dissolve.

It is known, in fact, that as these gels cannot be easily dispersed in a high-viscosity matrix such as spinning solutions, they are difficult to attack. In particular, these gels can withhold undissolved polymer particles in their interior, forming a low-quality spinning solution.

The homogeneous suspension thus obtained at the end of step i) can be subsequently transformed into a homogeneous solution (also called "dope") free of gels and undissolved residues, ready for spinning.

One of the ways of effecting the dissolution of the suspension and its transformation into dope can comprise feeding the suspension to a heat exchanger which rapidly raises the temperature of the suspension from 5° C. to 110° C., producing a homogeneous solution, free of gels and undissolved residues, capable of being fed directly to the spinning machine. The presence of static or dynamic mixers capable of facilitating the homogenization and dissolution of the suspension, may be appropriate.

The operations of dissolving the suspension and its transformation into dope can also be carried out discontinuously, carrying out a gradual heating of the whole mass, keeping the suspension under stirring with suitable rotors capable of managing the variations in viscosity of the medium being dissolved.

The spinning solution or dope thus obtained can be immediately used for feeding a suitable spinning line or it can be stored in heated tanks.

The "solvent-water" proportion used in the process according to the present invention can be obtained by mixing the correct proportions of pure liquid solvents (DMSO/water) or it can be obtained by partial distillation of diluted solvent (DMSO) or by adding the wet polymer to the pure solvent, containing the correct quantity of water capable of providing a solution at the desired concentration.

In this latter case, the cooling of the mixture is effected contemporaneously with the dilution of the solvent, for example in a disperser capable of cooling the mixture, thus allowing the formation of a homogeneous polymeric suspension.

On cooling, the suspension kept under stirring, will reach the correct solvent/water proportion, allowing a homogenous imbibition of the polymer with the DMSO/water solution at the desired concentration.

It has been observed that the presence of water on the polymer limits the aggression of the non-cooled DMSO solvent on the polymer before lowering the temperature and, thanks to its greater density due to the presence of water, the dispersion of the "wet" polymer is easier than the dispersion of the dry polymer.

EXAMPLES

Some embodiment examples of the process according to the present invention are provided hereunder together with some comparative examples, for illustrative but non-limiting purposes of the invention itself.

Example 1

Dissolution of a High-Molecular-Weight Acrylic Copolymer ($MW_n$=75,000-100,000) Composed of Acrylonitrile (96% by Weight with Respect to the Total Weight of the Polymer) and the Pair Methyl Acrylate-Itaconic Acid (4% by Weight with Respect to the Total Weight of the Polymer)

The polymer was dispersed in a solution of DMSO/Water 95/5 maintained at a temperature of 5° C.

The dissolution of the polymer in the solvent solution was effected in an industrial line for the production of spinning solutions of acrylic polymers. The line consisted of:
  a storage silo of the acrylic polymer;
  a "weight loss" dosing unit in continuous of the polymer flow;
  a prismatic tower (as previously described with reference to FIG. 1) for mixing the polymer with the solvent;
  a collection tank of the solvent-polymer suspension (slurry);
  a gear pump for transferring the slurry;
  a tube-bundle exchanger for forming the spinning solution (dope);
  a static mixer for homogenizing the dope;
  a cooling exchanger for stabilizing the temperature of the dope;
  a tank for the deaeration of the dope at atmospheric pressure;
  a gear pump for transferring the dope;
  a battery of filter-presses with selectivity cloths of 40 μm for removing possible undissolved particles;
  a battery of filter-presses with selectivity cloths of 15 μm for removing possible undissolved particles;
  a tank for the deaeration of the dope under vacuum;
  a tank for storing the dope before spinning;
  a gear pump for transferring the dope to the spinning phase;
  a tube-bundle exchanger for heating the dope before spinning;
  a battery of filter-presses with selectivity cloths of 5 μm for removing undissolved particles.

The dissolution process of the polymer in the solvent solution was carried out under the following conditions:
  polymer flow-rate 250 kg/h at room temperature;
  flow-rate of solvent solution (DMSO/Water 95/5) 1,050 kg/h maintained at T=5° C. with the use of a cooling group;
  temperature of the solution leaving the heating exchanger: 88° C.;
  temperature of the solution leaving the cooling exchanger: 70° C.

The dope produced is characterized by a viscosity at 70° C. of about 250 poise.

The measurement of the viscosity was verified using both a "ROTOVISCO" Haake rotational viscometer with a MCV2 cylindrical rotor having a thermostat-regulated cell and also using a Hoppler viscometer, controlling the falling time of a steel ball in the polymeric solution which had a viscosity of 450 poise at 50° C.

The quality of the spinning solution obtained is determined by the absence of impurities such as undissolved polymer particles and gels. These impurities gather on the holes of the spinnerets, jeopardizing the quality of the fiber produced.

The method for determining the quality of the spinning solution is the filterability test.

The test consists in determining the clogging rate on a standard pore size (SEFAR-Nytal 5 μm) of the dope being examined.

In practice, the filterability test is carried out in an apparatus comprising (see FIG. 2):

a storage tank of the dope (3') with a thermoregulating jacket (4');

a dosing gear pump (6');

a jacketed-tube heat exchanger (7') fed with steam at 0.4 ate (length 1,400 mm, volume 90 ml);

a jacketed-tube heat exchanger (8') fed with water at 50° C. for thermoregulating the dope;

a pressure gauge (9');

a filter block (10') (SEFAR-Nytal 5 μm pore size).

Figure 2:
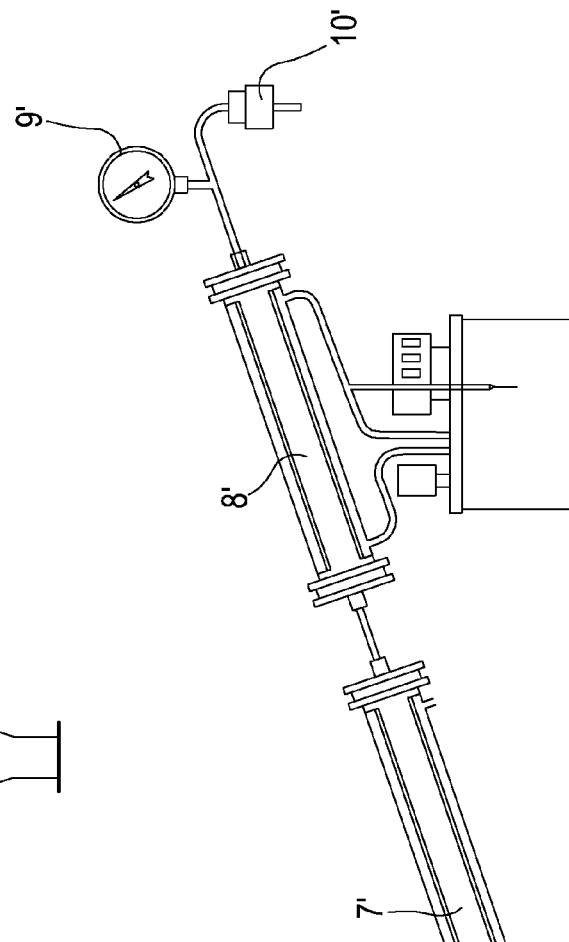
FIG. 2 is a schematic elevation of an apparatus to determine the filterability of the spinning solution.
Figure 2:
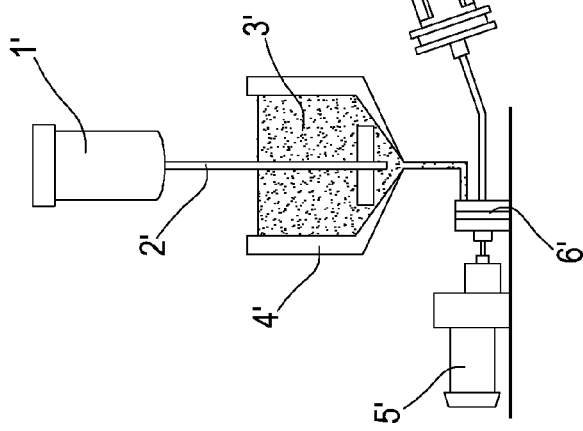

FIG. 2 also indicates the motor with 1', the stirrer with 2' and the motor of the dosing pump with servo-gear unit of the "stober" type, with 5'.

The spinning solution was stored in the tank at a temperature of 50° C. The dope was then heated by means of steam to 110° C. with a flow-rate of the pump equal to 27 ml/min (residence time 3.3 min). The dope was subsequently cooled to 50° C. by means of the exchanger connected with the thermostat-regulated water bath. The cooled dope then passed through the filter block where the pressure was revealed by means of a pressure gauge. The clogging rate of the filter was evaluated by the increase in pressure as ΔP in ate/h.

In the present example, the increase in ΔP in the control equipment proved to be equal to 0.4 ate/h. This pressure increase corresponds, in an industrial situation, to correct operating conditions of the line: this value, in fact, envisages a blockage of the system by clogging of the filter-press with 5 μm pore size, after 150 hours (6.25 days); a value of 150 hours therefore indicates a guarantee of continuity of the spinning, in optimum conditions.

The solvent polymer solution thus obtained was fed to a spinning line for precursors of carbon fibers.

During the spinning process, the spinnerets, immersed in a coagulation bath composed of a mixture of water and DMSO, generated a perfectly round, compact, voids-free fiber. The fiber thus obtained was subjected to washings with deionized water to remove the residual solvent, stretched in various steps in boiling water for about 8 times its initial length; dried on hot rolls and collected on bobbins. The tows obtained are composed of fibers having a diameter of about 12 microns, an average tenacity of 56 cN/Tex and breaking elongation of about 17%, measured on an Instron 5542 dynamometer with a 10N cell according to the method ASTM D-3822, proving to be suitable for transformation into carbon fibers.

Example 2

Comparative

Dissolution of a High-Molecular-Weight Acrylic Copolymer ($MW_n$=75,000-100,000) Composed of Acrylonitrile (96% by Weight with Respect to the Total Weight of the Polymer) and the Pair Methyl Acrylate-Itaconic Acid (4% by Weight with Respect to the Total Weight of the Polymer)

The polymer was dispersed in DMSO at 100% maintained at a temperature of 20° C.

The dissolution of the polymer in the solvent solution was effected in the same industrial line used in Example 1.

The dissolution conditions of the polymer in the solvent solution were the following:

polymer flow-rate 250 kg/h at room temperature;

flow-rate of solvent (DMSO 100%) 1,000 kg/h maintained at T=20° C. with the use of a cooling unit;

temperature of the solution at the outlet of the heating exchanger: 88° C.;

temperature of the solution at the outlet of the cooling exchanger: 70° C.

The viscosity of the dope produced, measured with a rotational viscometer as in Example 1, at 70° C., is equal to 260 poise.

The increase in ΔP with the filterability test proved to be equal to 4.2 ate/h. This increase in pressure corresponds to the complete clogging of the filter-press with 5 μm pore size every 14.3 hours; this value therefore indicates spinning disturbed by the presence of high quantities of impurities in the dope and is incompatible with a correct operability of the production line.

The solution was in any case fed to the spinning machine described in Example 1.

The product proved to be difficult to transform, revealing numerous breakages in the filaments in the coagulation bath and the impossibility of undergoing a stretching in hot water higher than 4 times the initial length. These difficulties precluded the possibility of collecting sufficient quantities of finished fiber for testing its characteristics as precursor for carbon fiber.

Example 3

Dissolution of a Medium-Molecular-Weight Acrylic Copolymer for Textile Use ($MW_n$=40,000-55,000) Composed of Acrylonitrile and Vinyl Acetate (93/7 by Weight with Respect to the Total Weight of the Polymer)

The polymer was dissolved in a solution of DMSO/Water 95/5, maintained at a temperature of 5° C.

The dope thus produced is characterized by a viscosity at 80° C. of about 198 poise. The measurement of the viscosity was effected using a "ROTOVISCO" Haake rotational viscometer with a MCV2 cylindrical rotor having a thermostat-regulated cell, and also using a Hoppler viscometer, controlling the falling time of a steel ball in the polymeric solution which had a viscosity of 410 poise at 50° C.

The dissolution of the polymer in the solvent solution was effected in an industrial line for the production of a spinning solution for acrylic polymers, the same as that used in Example 1.

The conditions for the dissolution of the polymer in the solvent solution were the following:

polymer flow-rate 250 kg/h at room temperature;
flow-rate of solvent solution (DMSO/Water 95/5) 976 kg/h maintained at T=5° C. with the use of a cooling group;
temperature of the solution at the outlet of the heating exchanger: 85° C.;
temperature of the solution at the outlet of the cooling exchanger: 70° C.

In this example, the increase in $\Delta P$ in the test effected by the apparatus of FIG. 2 proved to be 0.28 ate/h. This increase in the pressure corresponds to the complete clogging of the filter-press with 5 μm cloths every 214 hours, equal to 8.9 days, an acceptable value for the operability of the production line.

The solvent polymer solution thus produced was fed to a spinning line for textile fibers; the spinnerets, immersed in a coagulation bath composed of a water/solvent mixture, generate fibers free from voids. The fibers were washed in deionized water, stretched for about 5 times the initial length, dried on hot rolls and curled in a crimping machine. The strips of fiber collected in tows (bundles of fiber) of about 110 g/m (Ktex) were subjected to steaming to obtain fibers with a count of 3.3 dtex, a tenacity equal to about 28 cN/tex and a breaking elongation equal to about 35%, measured on an Instron 5542 dynamometer with a 10N cell according to the method ASTM D-3822. A fiber with these characteristics proved to be suitable for transformation into end-products with textile cycles typical of acrylic fibers.

Example 4

Comparative

Dissolution of a Medium-Molecular-Weight Acrylic Copolymer for Textile Use ($MW_n$=40,000-55,000) Composed of Acrylonitrile and Vinyl Acetate (93/7 by Weight with Respect to the Total Weight of the Polymer)

The polymer was dissolved in DMSO at 100% maintained at a temperature of 20° C.

The dissolution of the polymer in the solvent solution was effected in the same industrial line used in Example 1.

The dissolution conditions of the polymer in the solvent solution were the following:
polymer flow-rate 250 kg/h at room temperature;
flow-rate of solvent (DMSO 100%) 976 kg/h maintained at T=20° C. with the use of a cooling group;
temperature of the solution at the outlet of the heating exchanger: 85° C.;
temperature of the solution at the outlet of the cooling exchanger: 70° C.

In the present example, the increase in $\Delta P$ with the filterability test is equal to 2.7 ate/h. This increase in pressure corresponds to the complete clogging of the filter-press with 5 μm cloths every 22.2 hours: this value is completely incompatible with the correct functioning of industrial production lines.

Example 5

Dissolution of a Very High-Molecular-Weight Acrylic (Homo)-Polymer ($MW_n$=140,000-160,000) for High-Performance Technical Uses Composed of Acrylonitrile Alone (100% by Weight)

The polymer was dissolved in a solution of DMSO/Water 95/5 maintained at a temperature of 5° C.

The conditions for the dissolution of the polymer in the solvent solution were the following:
polymer flow-rate 250 kg/h at room temperature;
flow-rate of solvent solution (DMSO/Water 95/5) 1,785 kg/h maintained at T=5° C. with the use of a cooling group;
temperature of the solution at the outlet of the heating exchanger: 100° C.;
temperature of the solution at the outlet of the cooling exchanger: 85° C.

The dope produced, with a low residual water content, is characterized by a viscosity at 70° C., of 230 poise, measured by means of a "ROTOVISCO" Haake rotational viscometer with a MCV2 cylindrical rotor having a thermostat-regulated cell.

The quality of the polymeric solution was evaluated with the apparatus described in FIG. 2 and proved to be analogous to that produced with the use of dimethylacetamide as solvent, showing a pressure increase equal to 0.56 ate/h. In the production line considered, this pressure increase corresponds to the clogging of the filter press with 5 μm cloths every 107 hours, equal to 4.4 days; this value is a sufficient guarantee of continuity of the spinning under good conditions.

A comparative test was also carried out with DMSO at 100%: the increase in $\Delta P$ with the filterability test showed a value equal to 3.2 ate/h. This is an unacceptable value, corresponding to blockage of the filters, i.e. exceeding the operating conditions of the filters in very short times.

The invention claimed is:

1. A process for preparing a homogeneous spinning solution for the production of acrylic fibers which comprises the following steps:
   i) preparation of a homogeneous suspension by mixing a powder homopolymer or copolymer of acrylonitrile with a mixture of DMSO/water in an amount of from 94.5/5.5 to 97/3% w/w at a temperature of from 5° C. to 10° C., said mixing being carried out in a time ranging from 5 to 30 minutes, by spraying a stream of the DMSO/water solvent on a stream of powder homopolymer or copolymer of acrylonitrile, disintegrated and premixed;
   ii) heating the homogeneous suspension coming from step i) at a temperature ranging from 70° C. to 150° C. in a time ranging of from 0.5 to 30 minutes, until the complete dissolution of the homopolymer or copolymer and the formation of a homogeneous solution.

2. The process according to claim 1, wherein the acrylonitrile copolymer consists of acrylonitrile in an amount ranging of from 90 to 99% by weight with respect to the total weight of the copolymer and one or more co-monomers in an amount ranging from 1 to 10% by weight with respect to the total weight of the copolymer.

3. The process according to claim 2, wherein the co-monomers are selected from vinyl neutral compounds and compounds bearing one or more acid groups.

4. The process according to claim 1, wherein the polymers are polymers of high molecular weight, said molecular weight MWn ranging from 80000 to 200000.

5. The process according to claim 1, wherein, wherein the polymers are polymers of medium molecular weight, said molecular weight MWn ranging from 40000 to 55000.

6. The process according to claim 1, wherein the homogeneous solution obtained at the end of step ii) is sent to a storage tank.

7. The process according to claim 1, wherein the homogeneous solution obtained at the end of step ii) is fed to the next stage of spinning.

8. An apparatus for the preparation of a homogeneous spinning solution for the production of acrylic fibers according to claim 1, said apparatus comprising an inlet zone (1) for the feeding of the polymer or copolymer powder, with a baffling system (2), downstream of which is arranged a room or static mixer (4) equipped with spray nozzles (3) for the supply of the solvent, distributed on a circumference at 120° from each other and located on four different levels within this chamber or mixer (4).

9. The apparatus according to claim 8, wherein the pressure of the solvent in the nozzles inlet manifold is maintained between 2.5 and 3.5 $bar_{abs}$.

10. The process according to claim 1, wherein the mixture of DMSO/water is 95/5.

11. The process according to claim 1, wherein the temperature of step i) is 5° C.

12. The process according to claim 10, wherein the temperature of step i) is 5° C.

13. The process according to claim 3, wherein the vinyl neutral compounds are selected from the group consisting of methyl acrylate, methyl methacrylate, vinyl acetate, and acrylamide.

14. The process according to claim 3, wherein the compounds bearing one or more acid groups are selected from the group consisting of acrylic acid, itaconic acid, and sulfonated styrenes.

\* \* \* \* \*